(12) United States Patent
Zhang et al.

(10) Patent No.: US 7,604,390 B2
(45) Date of Patent: Oct. 20, 2009

(54) SUPPORTING STRUCTURE AND FIXING COMPONENT HAVING A THROUGH-HOLE AND OPENING FOR PIN STRUCTURE ENGAGEMENT AND BACKLIGHT MODULE USING THE SAME

(75) Inventors: Jing-Lin Zhang, Hsin-Chu (TW); Meng-Jia Hsiao, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 113 days.

(21) Appl. No.: 11/808,659

(22) Filed: Jun. 12, 2007

(65) Prior Publication Data
US 2008/0106905 A1 May 8, 2008

(30) Foreign Application Priority Data
Nov. 2, 2006 (TW) ............................... 95140628 A

(51) Int. Cl.
*F21V 7/04* (2006.01)
(52) U.S. Cl. .................. 362/634; 362/632; 362/633
(58) Field of Classification Search ......... 362/632–634, 362/97, 561, 225, 240, 306, 382; 349/58, 349/60, 61–71
See application file for complete search history.

(56) References Cited

U.S. PATENT DOCUMENTS

| 7,070,313 | B2 | 7/2006 | Kim et al. |
| 7,357,535 | B2* | 4/2008 | Tsai et al. ................ 362/296 |
| 2005/0073858 | A1* | 4/2005 | Kim et al. .................. 362/561 |
| 2005/0225960 | A1 | 10/2005 | Tsai |
| 2005/0281050 | A1* | 12/2005 | Chou ...................... 362/612 |
| 2006/0023472 | A1 | 2/2006 | Liu et al. |
| 2006/0034090 | A1 | 2/2006 | Chen et al. |
| 2006/0039163 | A1 | 2/2006 | Yun |
| 2006/0104080 | A1 | 5/2006 | Kim et al. |

FOREIGN PATENT DOCUMENTS

JP 2004251931 A * 9/2004

(Continued)

OTHER PUBLICATIONS

English Abstract of Japanese Publication JP 2004251931 A.*

*Primary Examiner*—Anabel Ton
*Assistant Examiner*—Kevin Spinella
(74) *Attorney, Agent, or Firm*—Rabin & Berdo, PC

(57) ABSTRACT

A supporting structure is applied to a backlight module including several optical sheets. The supporting structure includes a fixing component and a supporting component. The fixing component has a through-hole and an opening connected to each other. The supporting component includes a supporting pin, a block, a plate and a protrusion. The supporting pin has a top end for supporting the optical sheets and a bottom end at which the block is disposed. The plate is disposed on the supporting pin. The protrusion is disposed on the plate and faces the bottom end. After the block goes through the through-hole and rotates an angle, the plate and the block respectively press against upper and lower surfaces of the fixing component for clamping the fixing component. The protrusion is engaged in the opening for positioning the supporting component, so that the supporting component is fixed onto the fixing component.

17 Claims, 3 Drawing Sheets

FOREIGN PATENT DOCUMENTS

| | | |
|---|---|---|
| TW | I255896 | 1/1994 |
| TW | I255895 | 5/1994 |
| TW | M284909 | 1/2006 |
| TW | M284912 | 1/2006 |
| TW | M284914 | 1/2006 |

* cited by examiner

SUPPORTING STRUCTURE AND FIXING COMPONENT HAVING A THROUGH-HOLE AND OPENING FOR PIN STRUCTURE ENGAGEMENT AND BACKLIGHT MODULE USING THE SAME

This application claims the benefit of Taiwan Patent Application Serial No. 95140628, filed Nov. 2, 2006, the subject matter of which is incorporated herein by reference.

BACKGROUND OF THE INVENTION

1. Field of the Invention

The invention relates in general to a supporting structure, and more particularly to a supporting structure applied to a backlight module.

2. Description of the Related Art

As the technology of liquid crystal display (LCD) devices develops rapidly, the quality, reaction speed and panel size of LCD devices have improved greatly. Due to the advantages of LCD devices, including compact size, light weight, low electricity consumption and low radiation, LCD devices has now been widely applied to all kinds of electronic products, such as notebooks, digital cameras, digital camcorders, mobile phones, computer screens and liquid crystal televisions. However, the liquid crystal display panels in the LCD devices are non-self-luminous, backlight modules are required to provide light sources to display images.

Referring to FIG. 1, a conventional backlight module is illustrated in FIG. 1. Generally speaking, a conventional backlight module 10 includes a back plate 11, at least a supporting pin 12, several lamps 13 and several optical sheets 14. The optical sheets 14 are disposed over and parallel to the back plate 11, so that light emitted from the light source 13 diffuses to the optical sheets 14 uniformly without dark areas. The supporting pin 12 is disposed on the back plate 11 for supporting the optical sheets 14. Therefore, a gap h is formed between the optical sheets 14 and the back plate 11, and the optical sheets 14 remain parallel to the back plate 11.

In related arts, there are many different kinds of supporting pins. A structure of a rotating supporting pin embedded in a backlight module disclosed in Taiwan Patent No. 284914 (published Jan. 1, 2006) includes a base and a back plate. The base includes two latches. A block is formed at the end of each latch. After the base rotates, the blocks are engaged in two positioning holes of the back plate so as to fix the base onto the back plate. However, because having insufficient structural strength, the latch is easily broken. Also, the volume of the structure is large, which increases the cost of developing the mold.

Also, a rotating supporting pin structure of a backlight module disclosed in Taiwan Patent No. 284912 (published on Jan. 1, 2006) includes a rotating base, a locking pad and a back plate. A shaft of the rotating base is engaged in a first track hole of the back plate and a second track hole of the locking pad for fixing the rotating base onto the back plate. However, the supporting pin is a three-piece structure, which is complicated and increases the manufacturing cost of the supporting pin.

Furthermore, a lamp guide device and a backlight assembly for liquid crystal display device using the same are disclosed in U.S. Pat. No. 7,070,313 (published on Jul. 4, 2006). A lamp guide device is disposed on a lower case for supporting several optical sheets. A guide connecting hole and several concavities are formed respectively on the lower case so as to fix the lamp guide device onto the lower case. The lamp guide device only can be applied to a lamp-type backlight source. As a result, the manufacturing process is complicated, and the cost is increased. Additionally, the types of backlight assembly that the lamp guide device can be applied to are limited.

SUMMARY OF THE INVENTION

The invention is directed to a supporting structure and a backlight module using the same. By the engagement of a simple supporting component with a fixing component having a small opening, the volume of the supporting structure is reduced, and the manufacturing cost is lowered. Also, the strength of the supporting structure is enhanced.

According to the present invention, a supporting structure applied to a backlight module is provided. The backlight module includes at least several optical sheets. The supporting structure includes a fixing component and a supporting component. The fixing component has a through-hole and an opening connected together. The supporting component includes a supporting pin, a block, a plate and a protrusion. The supporting pin has a top end and a bottom end. The top end is used for supporting the optical sheets. The block is disposed at the bottom end. The plate is disposed on the supporting pin. The protrusion is disposed on the plate and faces the bottom end. When the block goes through the through-hole and rotates an angle, the plate and the block respectively press against the upper surface and the lower surface of the fixing component to clamp the fixing component. The protrusion is engaged in the opening correspondingly for positioning the supporting component. As a result, the supporting component is fixed onto the fixing component.

According to the present invention, a backlight module including several optical sheets, a supporting structure, a circuit board and a light emitting device is provided. The supporting structure includes a fixing component and a supporting component. The fixing component has an upper surface, a through-hole and an opening. The upper surface faces the optical sheets. The through-hole is connected to the opening. The supporting component includes a supporting pin, a block, a plate and a protrusion. The supporting pin has a top end and a bottom end. The top end is used for supporting the optical sheets on the fixing component. The optical sheets are parallel to the fixing component. The block is disposed at the bottom end. The plate is disposed on the supporting pin. The protrusion is disposed on the plate and faces the bottom end. The circuit board is disposed on the upper surface. The light emitting device is disposed on the circuit board for providing a backlight source. After the block goes through the through-hole and rotates an angle, the plate and the block respectively press against the upper surface and the lower surface of the fixing component to clamp the fixing component. The protrusion is engaged in the opening correspondingly for positioning the supporting component. As a result, the supporting component is fixed onto the fixing component.

The invention will become apparent from the following detailed description of the preferred but non-limiting embodiments. The following description is made with reference to the accompanying drawings.

DETAILED DESCRIPTION OF THE INVENTION

Figure 1:
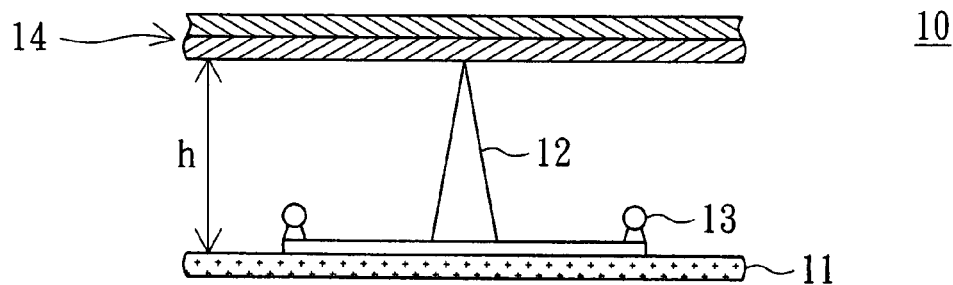
FIG. 1 (Prior Art) illustrates a conventional backlight module.
Figure 2A:
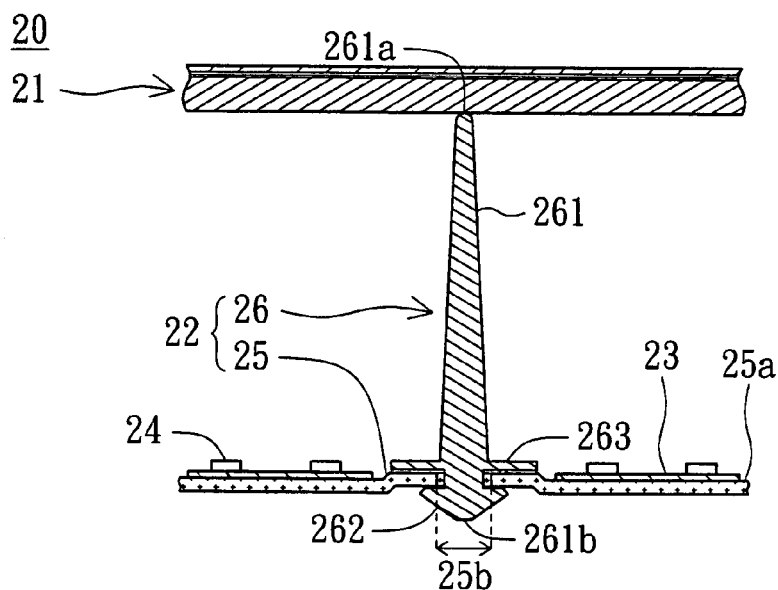
FIG. 2A is a cross-sectional view of a backlight module according to a preferred embodiment of the present invention.
Figure 2B:
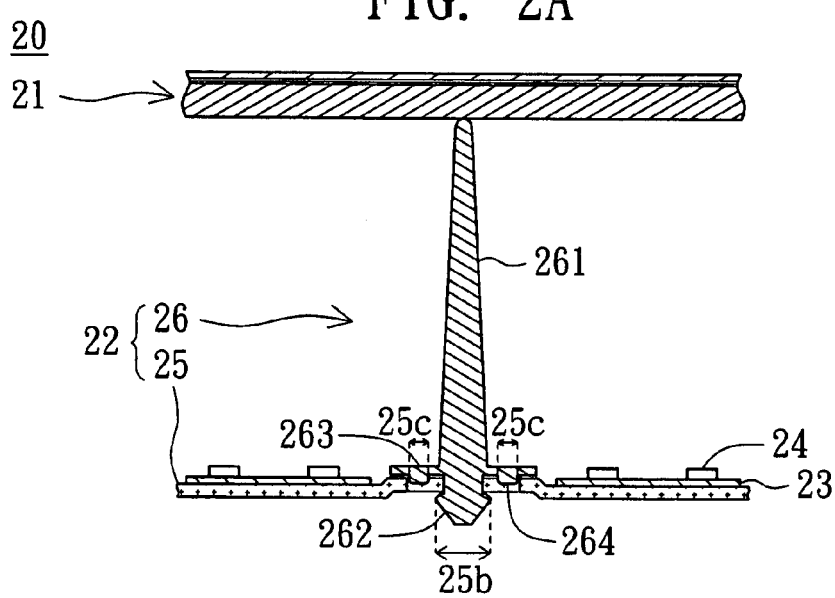
FIG. 2B is another cross-sectional view of the backlight module in FIG. 2A.

Referring to FIGS. 2A~2B. FIG. 2A is a cross-sectional view of a backlight module according to a preferred embodiment of the present invention. FIG. 2B is another cross-sectional view of the backlight module in FIG. 2A. The backlight module 20 includes several optical sheets 21, a supporting structure 22, a circuit board 23 and a light emitting device 24. The optical sheets 21 are laminated with one another. The supporting structure 22 includes a fixing component 25 and a supporting component 26. The fixing component 25 has an upper surface 25a, a through-hole 25b and an opening 25c (shown in FIG. 2B). The upper surface 25a of the fixing component 25 faces the optical sheets 21. The through-hole 25b is connected to the opening 25c. The supporting component 26 includes a supporting pin 261, a block 262, a plate 263 and a protrusion 264 (shown in FIG. 2B). The supporting pin 261 has a top end 261a and a bottom end 261b. The top end 261a is used for supporting the optical sheets 21 on the fixing component 25. The optical sheets 21 are parallel to the fixing component 25. The block 262 is disposed at the bottom end 261b. The plate 263 is disposed on the supporting pin 261. The protrusion 264 is disposed on the plate 263 and faces the bottom end 261b. The circuit board 23 is disposed on the upper surface 25a. The light emitting device 24 is disposed on the circuit board 23 for providing a backlight source.

Furthermore, the fixing component 25 of the present embodiment is a back plate of the backlight module 20. The back plate is preferably made of metal, so that the supporting component 26 can be fixed onto the fixing component 25 firmly. The light emitting device 24 is a light emitting diode (LED) or a cold cathode fluorescent lamp (CCFL) for example. In the present embodiment, several light emitting diodes are disposed on the circuit board 23 as the backlight source of the backlight module 20. The supporting component 26 is used for supporting the optical sheets 21, so that the optical sheets 21 are disposed at a distance from the fixing component 25. As a result, a space is formed between the optical sheets 21 and the fixing component 25, so that light emitted from the light emitting device 24 diffuses to the optical sheets 21 uniformly. Therefore, the backlight source provided by the backlight module 20 is a uniform light source.

Figure 3:
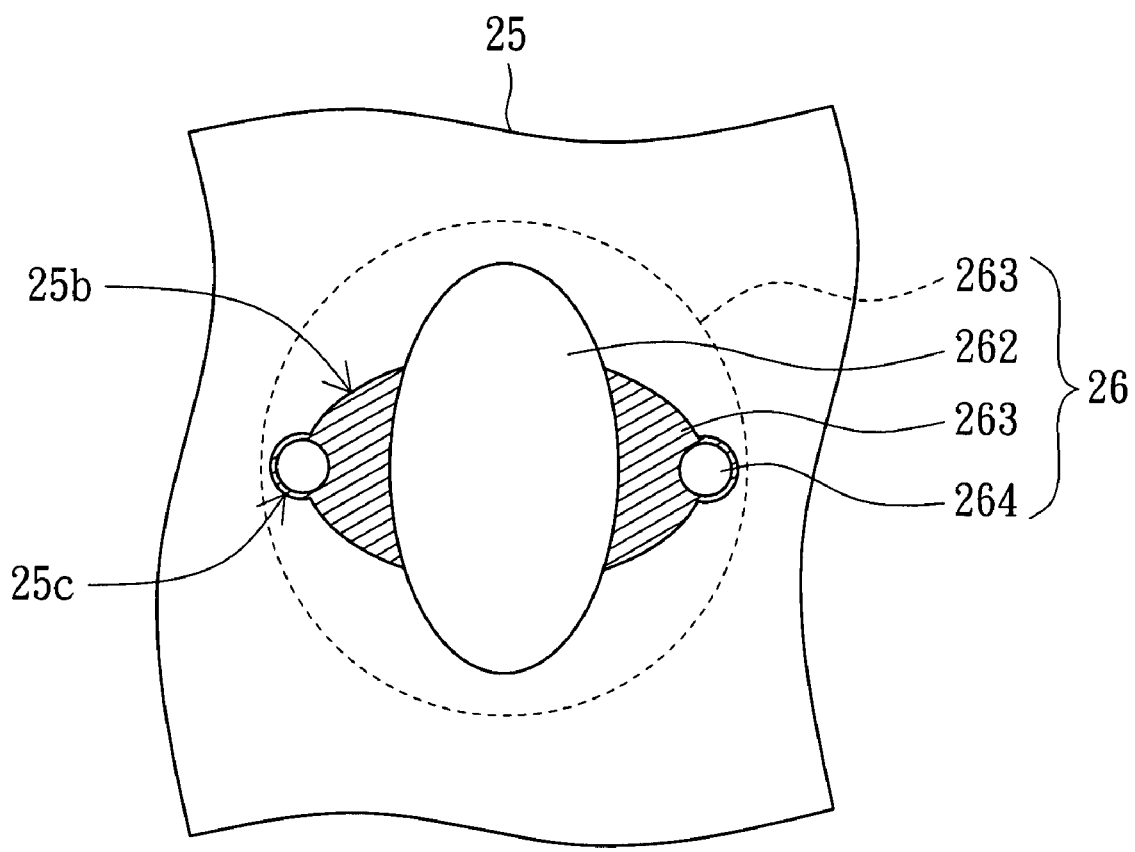
FIG. 3 illustrates a supporting structure according to the preferred embodiment of the present invention.
Figure 4:
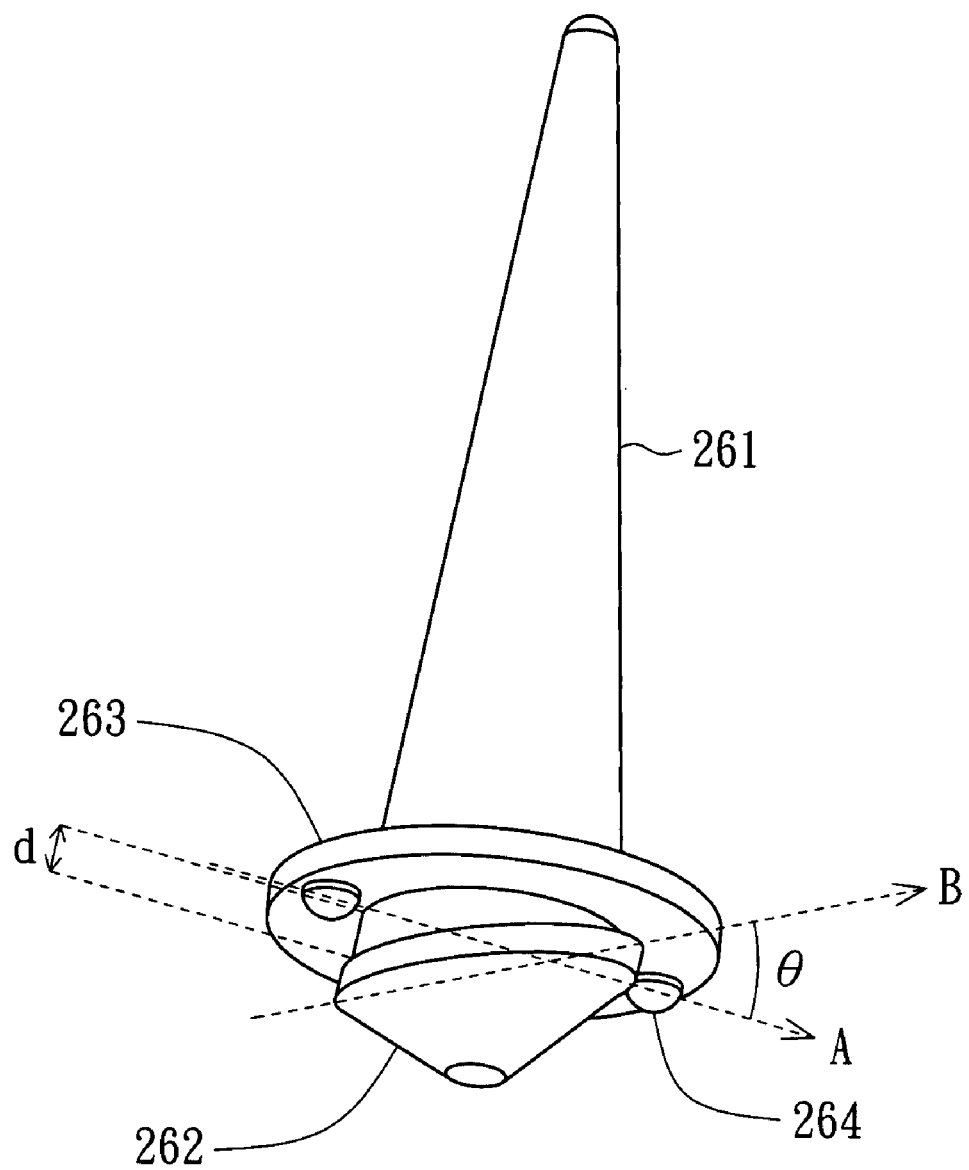
FIG. 4 is a three-dimensional view of a supporting component in FIG. 3.

Referring to FIG. 3 and FIG. 4 at the same time. FIG. 3 illustrates the supporting structure according to the preferred embodiment of the present invention. FIG. 4 is a three-dimensional view of the supporting component in FIG. 3. In the present embodiment, the supporting component 26 includes two protrusions 264. Two openings 25c are formed on the fixing component 25 correspondingly. The plate 263 is a circular plate. The two protrusions 264 are disposed on two sides of the plate 263 corresponding to the block 262. As shown in FIG. 3, the block 262 is preferably an elliptic cone for providing sufficient support. The through-hole 25b is preferably an ellipse correspondingly. The area of the through-hole 25b is at least equal to the maximum cross-sectional area of the block 262, so that the block 262 is able to go through the through-hole 25b. After the block 262 goes through the through-hole 25b and rotates an angle, the plate 263 and the block 262 respectively press against the upper and lower surfaces of the fixing component 25 to clamp the fixing component 25. The protrusions 264 are engaged in the openings 25c for positioning the supporting component 26, so that the supporting component 26 is fixed onto the fixing component 25. The openings 25c in the preferred embodiment of the invention penetrate through the fixing component 25. However, the openings 25c can also be exemplified by concaves that are formed by recessing a portion of the upper surface 25a that corresponding to the protrusions 264. Furthermore, other formations that enable the engagement of protrusions 264 and openings 25c are eligible herein.

As shown in FIG. 4, the protrusions 264 are disposed at two opposite sides on the plate 263 along a direction A. The block 262 has a longitudinal direction B. There is an angle $\theta$ between the longitudinal direction B and the direction A. This angle $\theta$ is the one that the block 262 rotates when the block 262 goes through the through-hole 25b to fix the supporting component 26 on the fixing component 25. In the present embodiment, the angle $\theta$ is preferably equal to 90°. The plate 263 is disposed at a distance d from the block 262. The distance d is substantially equal to the thickness of the fixing component 25. Therefore, when the supporting component 26 is fixed onto the fixing component 25, the plate 263 and the block 262 clamp the upper and lower surfaces of the fixing component 25 just right. The supporting pin 261 is a cone that narrows to a point from a round, flat base, therefore, as the supporting component 26 supports the optical sheets 21, the supporting component 26 does not bent.

Moreover, the block 262 and the through-hole 25b are preferably corresponding ellipses. Therefore, to fix the supporting component 26 onto the fixing component 25, firstly, is to align the longitudinal direction B of the block 262 to the longitudinal direction of the through-hole 25b. Then, the block 262 goes through the through-hole 25b, and the protrusions 264 contact the upper surface 25a of the fixing component 25 after the block 262 goes through the through-hole 25b for a distance. After that, the supporting component 26 rotates an angle relatively to the fixing component 25. This angle is the angle $\theta$ between the direction A and the longitudinal direction B, or a supplementary angle to the angle $\theta$. After the supporting component 26 rotates the above-described angle relatively to the fixing component 25, the protrusions 264 are located at the position of the openings 25c and engaged in the openings 25c. Because the distance d between the plate 263 and the block 262 is substantially equal to the thickness of the fixing component 25, the block 262 and the plate 263 clamp the upper surface 25a and the lower surface of the fixing component 25 respectively. As a result, the supporting component 26 is fixed onto the fixing component 25.

In the supporting structure and the backlight module using the same according to the preferred embodiment of the present invention, the plate and the block are used for clamping the fixing component. Also, the protrusion is engaged in the corresponding opening so as to fix the supporting component onto the fixing component. Therefore, the optical sheets are supported and disposed on the fixing component. The supporting structure and the backlight module according to the preferred embodiment have the advantages including:

1. The structure of the supporting component is simple, and the area of the opening is small, so the cost for developing the mold is lowered. In general, the manufacturing cost is reduced.
2. Only one action is needed to fix the supporting component onto the fixing component, that is, rotating the block. There is no requirement for other tools to fix the supporting component onto the fixing component. The fixing method is very simple and fast, and can be achieved easily.

3. The supporting component is fixed onto the fixing component by clamping the fixing component through the plate and block and engaging the protrusion in the opening. Therefore, the supporting component is reusable after the supporting component is taken out by rotating in the reverse direction.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A supporting structure applied to a backlight module, the backlight module comprising at least a plurality of optical sheets, the supporting structure comprising:
 a fixing component with a through-hole and two openings; and
 a supporting component, comprising:
  a supporting pin having a top end and a bottom end, the top end for supporting the optical sheets;
  an elongated block having a width and a length that is greater than the width, the length of the block defining a longitudinal direction of the block, the block being disposed at the bottom end;
  a plate disposed on the supporting pin and being disposed above the block and separated thereby by a narrowed neck portion; and
  two protrusions disposed at two opposite sides and directly on a bottom of the plate and facing the bottom end, the protrusions corresponding to the respective openings, an angle being defined between a direction connecting the protrusions and the longitudinal direction of the block, and the angle being larger than zero degrees;
 wherein after the block goes through the through-hole and is rotated by the angle, the plate presses against an upper surface of the fixing component the block presses against a lower surface of the fixing component, and the protrusions engage in the corresponding openings for positioning the supporting component, so as to fix the supporting component onto the fixing component.

2. The supporting structure according to claim 1, wherein the fixing component comprises a back plate.

3. The supporting structure according to claim 1, wherein the plate is disposed at a distance from the block, the distance is substantially equal to the thickness of the fixing component.

4. The supporting structure according to claim 1, wherein the angle is substantially equal to 90°.

5. The supporting structure according to claim 1, wherein the block comprises an elliptic cone.

6. The supporting structure according to claim 1, wherein the shape of the through-hole is an ellipse.

7. The supporting structure according to claim 1, wherein the supporting pin comprises a cone.

8. The supporting structure according to claim 1, wherein the plate comprises a circular plate.

9. A backlight module comprising:
 a plurality of optical sheets;
 a supporting structure comprising:
  a fixing component having an upper surface, a through-hole and two openings, the upper surface facing the optical sheets; and
  a supporting component, comprising:
   a supporting pin having a top end and a bottom end, the top end for supporting the optical sheets on the fixing component, the optical sheets parallel to the fixing component;
   an elongated block having a width and a length that is greater than the width, the length of the block defining a longitudinal direction of the block, the block being disposed at the bottom end;
   a plate disposed on the supporting pin and being disposed above the block and separated thereby by a narrowed neck portion; and
   two protrusions disposed at two opposite sides and directly on a bottom of the plate and facing the bottom end, the protrusions corresponding to the respective openings, an angle being defined between a direction connecting the protrusions and the longitudinal direction of the block, and the angle being larger than zero degrees;
 a circuit board disposed on the upper surface; and
 a light emitting device disposed on the circuit board for providing a backlight source;
 wherein after the block goes through the through-hole and is rotated by the angle, the plate presses against an upper surface of the fixing component the block presses against a lower surface of the fixing component respectively the protrusions engaging in the corresponding openings for positioning the supporting component, so as to fix the supporting component onto the fixing component.

10. The backlight module according to claim 9 wherein the plate is disposed at a distance from the block, the distance is substantially equal to the thickness of the fixing component.

11. The backlight module according to claim 9, wherein the angle is substantially equal to 90°.

12. The backlight module according to claim 9, wherein the fixing component comprises a back plate.

13. The backlight module according to claim 9, wherein the block comprises an elliptic cone.

14. The backlight module according to claim 9, wherein the shape of the opening is an ellipse.

15. The backlight module according to claim 9, wherein the supporting pin comprises a cone.

16. The backlight module according to claim 9, wherein the plate comprises a circular plate.

17. The backlight module according to claim 9, wherein the light emitting device comprises a light emitting diode (LED).

* * * * *